United States Patent
Chatterjee et al.

(10) Patent No.: US 11,953,390 B2
(45) Date of Patent: Apr. 9, 2024

(54) BACKPRESSURE MONITORING APPARATUS

(71) Applicant: Applied Materials, Inc., Santa Clara, CA (US)

(72) Inventors: Sukti Chatterjee, San Jose, CA (US); David Masayuki Ishikawa, Mountain View, CA (US); Yuriy V. Melnik, San Jose, CA (US); David A. Britz, Los Gatos, CA (US); Lance A. Scudder, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/537,807

(22) Filed: Nov. 30, 2021

(65) Prior Publication Data

US 2023/0168139 A1 Jun. 1, 2023

(51) Int. Cl.
| | |
|---|---|
| *G01L 13/00* | (2006.01) |
| *B05B 12/00* | (2018.01) |
| *G01F 1/34* | (2006.01) |

(52) U.S. Cl.
CPC ............... *G01L 13/00* (2013.01); *G01F 1/34* (2013.01); *B05B 12/006* (2013.01)

(58) Field of Classification Search
CPC ..................................... G01F 1/34; G01F 1/42
See application file for complete search history.

(56) References Cited

U.S. PATENT DOCUMENTS

| | | | |
|---|---|---|---|
| 10,697,344 B2 | 6/2020 | Barve et al. | |
| 2009/0007695 A1* | 1/2009 | Araki | G01F 1/44 73/861.47 |
| 2010/0084023 A1* | 4/2010 | Melcer | H01L 21/67219 137/861 |
| 2018/0009229 A1 | 1/2018 | Venner et al. | |
| 2019/0137104 A1* | 5/2019 | Jain | F02C 7/222 |
| 2019/0176075 A1* | 6/2019 | Hoff | F02M 35/024 |
| 2020/0173386 A1 | 6/2020 | Kiuchi | |

FOREIGN PATENT DOCUMENTS

CN 109386362 A 2/2019

OTHER PUBLICATIONS

Application No. PCT/US2022/050857, International Search Report and Written Opinion, dated Mar. 30, 2023, 10 pages.

\* cited by examiner

*Primary Examiner* — Peter J Macchiarolo
*Assistant Examiner* — John M Royston
(74) *Attorney, Agent, or Firm* — Kilpatrick Townsend & Stockton LLP (57) ABSTRACT

Exemplary backpressure monitoring apparatuses may include a fluid supply source having a fluid port. The backpressure monitoring apparatuses may include a flow control mechanism fluidly coupled with the fluid port. The backpressure monitoring apparatuses may include a delivery tube fluidly coupled with the flow control mechanism and the fluid port. The backpressure monitoring apparatuses may include a pressure differential gauge fluidly coupled with the delivery tube. The pressure differential gauge may include an interface mechanism that is engageable with an outlet of a fluid flow device.

14 Claims, 3 Drawing Sheets

BACKPRESSURE MONITORING APPARATUS

TECHNICAL FIELD

The present technology relates to backpressure monitoring apparatuses and methods of monitoring backpressure. More specifically, the present technology relates to systems and methods for measuring backpressure in fuel nozzles and other fluid flow devices.

BACKGROUND OF THE INVENTION

Over time, fuel nozzles and other fluid flow devices may become clogged or otherwise occluded due to the buildup of carbon deposits (e.g., coking) within the nozzle and/or as fuel filters or screen accumulate particulate the may reduce fluid flow through the nozzle. Reduced fluid flow conductance reduces the amount of fuel that is supplied to an engine and may result in power and/or efficiency losses. Additionally, the reduction of flow may alter the spray pattern of the fuel, which may lead to the generation of hot spots in an engine that may accelerate engine wear. Thus, there is a need for improved systems and methods that can be used to monitor fluid conductance through fuel nozzles and other fluid flow devices. These and other needs are addressed by the present technology.

BRIEF SUMMARY OF THE INVENTION

Exemplary backpressure monitoring apparatuses may include a fluid supply source having a fluid port. The backpressure monitoring apparatuses may include a flow control mechanism fluidly coupled with the fluid port. The backpressure monitoring apparatuses may include a delivery tube fluidly coupled with the flow control mechanism and the fluid port. The backpressure monitoring apparatuses may include a pressure differential gauge fluidly coupled with the delivery tube. The pressure differential gauge may include an interface mechanism that is engageable with an outlet of a fluid flow device.

In some embodiments, the fluid supply source may be operable in a positive pressure mode and a negative pressure mode. The fluid supply source may deliver fluid to the flow control mechanism and delivery tube at a fixed rate. The backpressure monitoring apparatuses may include the fluid flow device. The fluid flow device may include a fuel nozzle. The delivery tube may be sized to have a flow resistance that is less than a backpressure being monitored in the fluid flow device. The delivery tube may include a mating component that is coupleable with an inlet of the fluid flow device.

Some embodiments of the present technology may encompass methods of monitoring backflow in a fluid flow device. The methods may include introducing a fluid through a flow control mechanism. The fluid may be at a fixed flow rate. The methods may include flowing the fluid through an inlet of a nozzle. The methods may include measuring a pressure differential between the inlet and an outlet of the nozzle. The methods may include measuring a difference between the pressure differential and a baseline pressure differential. The methods may include determining whether flow conductance is reduced through the nozzle based on the difference between the pressure differential and the baseline pressure differential.

In some embodiments, the nozzle may include an additional inlet. The methods may include measuring an additional pressure differential between the additional inlet and the outlet. The methods may include measuring a difference between the additional pressure differential and an additional baseline pressure differential. The methods may include determining whether flow conductance is reduced through the nozzle based on the difference between the pressure differential and the baseline pressure differential and the difference between the additional pressure differential and an additional baseline pressure differential. The methods may include determining a source of reduced flow conductance through the nozzle based on the pressure differential between the inlet and the outlet and the pressure differential between the additional inlet and the outlet. The flow control mechanism may include a restrictor valve. The fluid may be introduced while the restrictor valve is at a first valve position. The methods may include adjusting a restrictor valve to a second valve position. The methods may include measuring the pressure differential between the inlet and the outlet at the second valve position. The methods may include determining a flow conductance through the nozzle based on the pressure differential. A negative pressure source may be used to introduce the fluid through the flow control mechanism. The methods may include coating an interior of the nozzle with an anti-coking material. The methods may include measuring a pressure differential between the inlet and the outlet of the coated nozzle. The methods may include measuring a difference between the pressure differential between the inlet and the outlet of the coated nozzle and the baseline pressure differential.

Some embodiments of the present technology may encompass methods of monitoring backpressure in a fluid flow device. The methods may include flowing a fluid through an inlet of a fluid flow device. The methods may include measuring a pressure differential between the inlet and an outlet of the fluid flow device. The methods may include measuring a difference between the pressure differential and a baseline pressure differential. The methods may include determining whether flow conductance is reduced through the fluid flow device based on the difference between the pressure differential and the baseline pressure differential.

In some embodiments, the fluid flow device may include a fuel nozzle, a cooling channel, a showerhead for distributing fluid, an endoscope, or a nanopore. The outlet may deliver the fluid to a pressurized environment. The methods may include coupling a first end of a fluid conduit with the outlet and positioning an open second end of the fluid conduit within the pressurized environment. The methods may include measuring the pressure differential between the inlet and the outlet at a plurality of different flow settings of a flow control mechanism coupled with a source of the fluid. The methods may include generating a pressure differential curve based on the pressure differential measured at each of the plurality of different flow settings of the flow control mechanism. The methods may include determining a flow conductance through the fluid flow device based on the pressure differential. The methods may include monitoring changes in flow conductance through the fluid flow device based on a plurality of pressure differential measurements. The methods may include mapping the changes in flow conductance to changes in spray patterns of the fluid flow device.

Such technology may provide numerous benefits over conventional systems and techniques. For example, the present technology may be used to determine whether any blockages, such as those due to residue buildup and/or filter saturation, are present within a given fluid flow device. In particular, by monitoring pressure differentials and backpressures, embodiments may enable coking within a fuel nozzle to be detected without disassembling and/or rebuilding the nozzle. Additionally, the present technology may provide enhanced abilities to detect flow conductance changes compared to conventional technologies. These and other embodiments, along with many of their advantages and features, are described in more detail in conjunction with the below description and attached figures.

BRIEF DESCRIPTION OF THE DRAWINGS

A further understanding of the nature and advantages of the disclosed technology may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION OF THE INVENTION

Fuel nozzles, such as those used in automobiles, helicopters, and other vehicles and machinery, may exhibit reduced flow conductance over time. This may be due to the buildup of carbon deposits (e.g., coking) and/or other residue within the nozzle and/or particulate that has accumulated on filters. The reduced flow conductance may reduce the amount of fuel that is delivered to the engine, which may lead to losses in efficiency and power. Additionally, such buildup may impact a spray flow pattern of the nozzle. For example, a spray pattern may shift from a concentric pattern to an off-center and/or asymmetrical pattern, which may lead to engine hot spots that may accelerate engine wear. Due to these challenges, as well as the criticality of the fuel nozzles for the operation of the given vehicle or machine, fuel nozzles may be serviced at predetermined intervals. For example, fuel nozzles in helicopters and other aircraft, the fuel nozzles are expected to fail (e.g., lose too much flow conductance and/or have too large of a shift in spray pattern) after 50-60 hours of flight time. Therefore, the nozzles may be serviced at more frequent intervals to ensure that the nozzles do not reach a point of failure. Servicing the fuel nozzle may include removing, cleaning, rebuilding, and/or replacing the nozzle. This may result in significant downtown for the equipment, and may require a technician to spend significant time completing the service operations, as each fuel nozzle on the aircraft is typically serviced at the same time.

Conventional flow testing for fuel nozzles typically involves measuring the spray pattern from the fuel nozzle. However, while this may provide an indication of when the spray pattern has deviated from a baseline pattern, such testing does not provide measurements or quantifiable information about the flow conductance through the fuel nozzle. While flow conductance and spray patterns may have some effect on one another, the two characteristics may not shift at the same time and/or rate. Therefore, by only relying on spray pattern testing, a significant reduction in flow conductance may go undetected and may lead to engine efficiency and power losses.

The present technology overcomes these challenges by providing backpressure monitoring apparatuses that may measure a pressure differential across an inlet and an outlet of a fuel nozzle to determine any change in backpressure within the nozzle. For example, embodiments of the present technology may deliver a fluid, such as air, at a fixed rate through the nozzle. Pressure differential measurements may be compared to baseline values to determine whether backpressure has increased within the nozzle, which may be indicative of the accumulation of residue and/or particulate buildup within the nozzle. The backpressure monitoring apparatuses may be portable, which may enable the apparatuses to be taken to the field to test the fuel nozzles while still at the vehicle. For example, the inlet and outlet of the nozzle may be coupled with a pressure differential gauge of the backpressure monitoring apparatus, and one or more pressure differential measurements may be taken. Each nozzle may be quickly tested without the need to disassemble and/or rebuild the component. Only those nozzles not meeting predetermined flow conductance thresholds may need to be removed for servicing and/or replacement. This may reduce downtime and may increase the flight-time (or other operational time) of the components, as premature servicing may be avoided in instances in which the flow conductance remains at satisfactory levels. Accordingly, the present technology may be used to provide a holistic approach to nozzle health monitoring.

Although the remaining disclosure will routinely identify specific backpressure monitoring apparatuses, nozzles, and other fluid flow devices utilizing the disclosed technology, it will be readily understood that the systems and methods are equally applicable to other devices. Accordingly, the technology should not be considered to be so limited as for use with these specific devices alone. The disclosure will discuss one possible backpressure monitoring apparatus that may be used to monitor backpressure, pressure differential, and flow conductance through a fluid flow device according to embodiments of the present technology before additional variations and adjustments to this system according to embodiments of the present technology are described.

Figure 1:
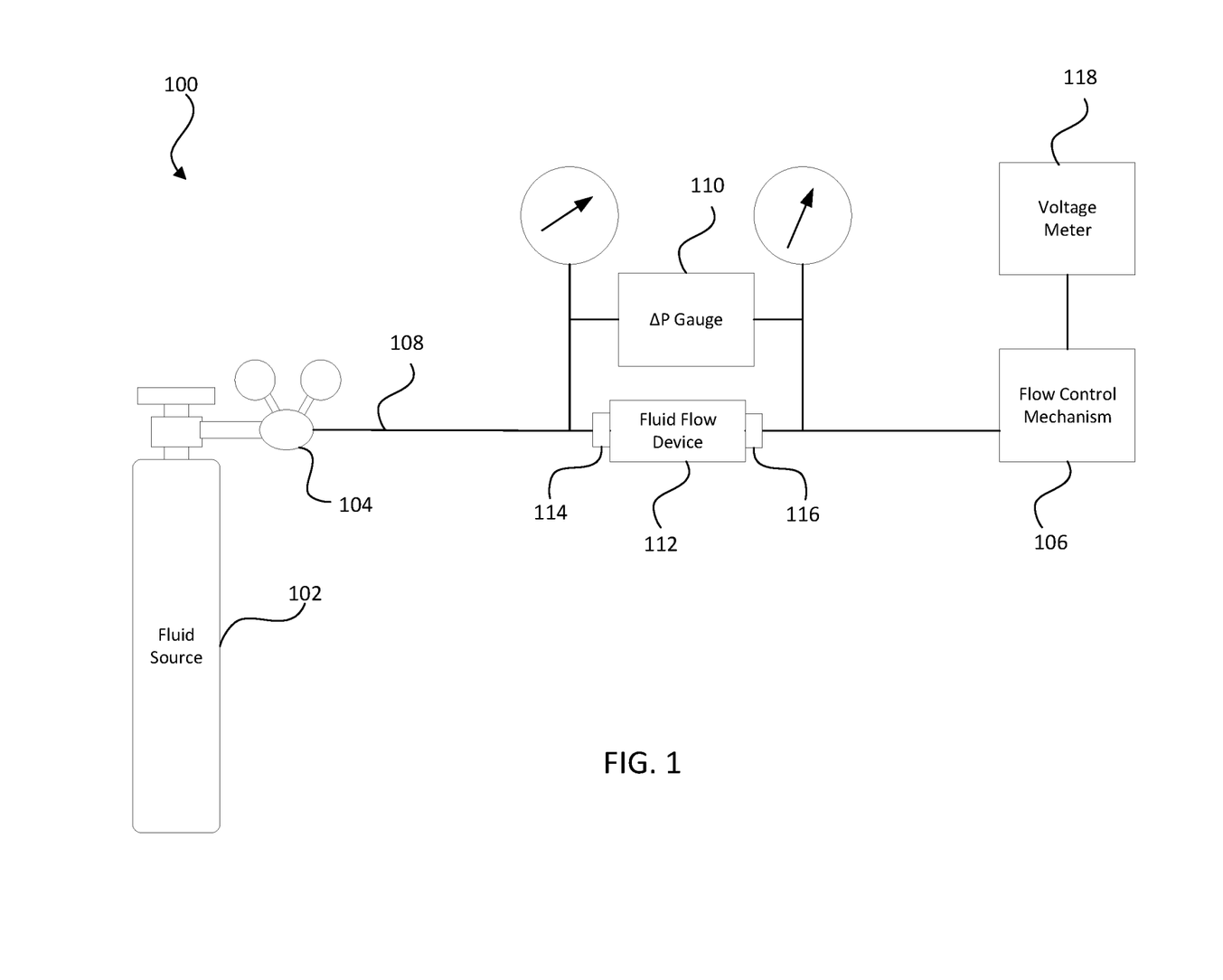
FIG. 1 illustrates a schematic view of an exemplary backpressure monitoring apparatus according to some embodiments of the present technology.

FIG. 1 illustrates a schematic view of an exemplary backpressure monitoring apparatus 100 according to some embodiments of the present technology. The backpressure monitoring apparatus 100 may be used to measure a pressure differential between an inlet and an outlet of a fluid flow device 112. The pressure differential may provide an indication of the flow conductance through the fluid flow device 112 and may indicate whether any residue buildup and/or other flow restrictions are affecting the fluid flow device 112. Although discussed primarily in relation to measuring flow conductance through a fuel nozzle, it is to be understood that the present technology is not limited to nozzles, and backpressure monitoring apparatuses may be used to monitor pressure differential in numerous other applications, such as a fuel nozzle, a cooling channel, a showerhead for distributing fluid, an endoscope, a nanopore, and/or any other device that may benefit from backpressure monitoring. In some embodiments, the backpressure monitoring apparatus 100 may be provided in a portable form. For example, each of the components of the backpressure monitoring apparatus 100 may be stowed within a case, such as a briefcase, for easy transport into the field for testing operations.

Backpressure monitoring apparatus 100 may include a fluid supply source 102. Fluid supply source 102 may include a fluid port 104 through which fluid may be flowed. The fluid supply source 102 may deliver the fluid throughout the backpressure monitoring apparatus 100 at a fixed rate. The fluid supply source 102 may be a positive pressure source, a negative pressure source, or both. For example, the fluid supply source 102 may be operated in a positive pressure mode in which the fluid supply source 102 pumps or otherwise propels a fluid out through the fluid port 104. The fluid supply source 102 may be operable in a negative pressure mode in which the fluid supply source 102 generates a vacuum to draw air or other fluid inward through the fluid port 104. Fluid supply source 102 may be operated using any fluid, including air, water, and/or other gases and/or liquids.

Backpressure monitoring apparatus 100 may include a flow control mechanism 106 that may be fluidly coupled with the fluid port 104 via one or more fluid lumens. The flow control mechanism 106 may control a flow rate of fluid and/or may restrict a size of a fluid pathway of the backpressure monitoring apparatus 100. For example, the flow control mechanism 106 may include a mass flow controller, which may be used to control the flow rate of the fluid according to a set flow rate sent as an electric signal. The fluid control mechanism 106 may include a restrictor valve, such as (but not limited to) a bellow metering valve, which may enable a size of an orifice within the valve to be adjusted to choke fluid flow and artificially introduce some amount of backpressure into the backpressure monitoring apparatus 100.

Backpressure monitoring apparatus 100 may include a delivery tube 108, which may be fluidly coupled with the flow control mechanism 106. The delivery tube 108 may deliver fluid to (or from, when in a negative pressure mode) one or more fluid flow devices 112 that are coupled with the backpressure monitoring apparatus 100. For example, a distal end of the delivery tube 108 may be interfaced with a port, such as an inlet, of the fluid flow device 112. In some embodiments, the delivery tube 108 may be sized to be inserted within a recess of the inlet to fluidly couple the fluid flow device 112 with the backpressure monitoring apparatus 100. In other embodiments, a lumen of the delivery tube 108 may be sized to receive a protrusion of the inlet to fluidly couple the fluid flow device 112 with the backpressure monitoring apparatus 100. In such embodiments, a diameter of the delivery tube 108 may be selected to tightly mate with the inlet of the fluid flow device 112 such that no fluid may leak out of the interface between the two components. In other embodiments, a distal end of the delivery tube 108 may include a mating component 114, such as an adapter fitting, that enables the delivery tube 108 to be engaged and/or otherwise interfaced with a port of a fluid flow device 112. The use of a mating component 114 may enable a diameter of the delivery tube 108 to be increased to a size that is larger than the inlet of the fluid flow device 112. In such embodiments, the delivery tube 108 may be a universal tube of a given diameter, with the mating component being switched out and/or adjusted to facilitate connection of the delivery tube 108 with various fluid flow devices 112. As friction between the fluid and the walls of the delivery tube 108 is the primary cause of resistance within the delivery tube 108, increasing the size of the delivery tube 108 may reduce the resistance of the delivery tube 108 due to the greater cross-sectional area available for the fluid. This may be particularly useful in applications in which the delivery tube 108 needs to be long, as the greater diameter (and reduced resistance) may enable a longer delivery tube 108 to be utilized without creating a large backpressure error signal. Regardless of the type of connection with the fluid flow device 112, the delivery tube 108 may be sized to have a flow resistance that is less than a backpressure being monitored in the fluid flow device, which may help to minimize and/or otherwise reduce an amount of pressure error introduced into the system.

The delivery tube 108 may include one or more segments that may extend from and couple the fluid port 104 with the fluid control mechanism 106. An end of at least one segment of the delivery tube 108 may be fluidly coupled with a pressure differential gauge 110. This may enable an inlet pressure of the fluid flow device 112 to be measured, as the delivery tube 108 may be maintained at a constant pressure across its length. The pressure differential may be measured as a voltage using a voltage reader 118. The voltage measurement may correspond with a given pressure differential. For example, voltage readings having higher magnitudes may correspond to more restricted flow within the fluid flow device 112. In some embodiments, the pressure differential gauge 110 may include a differential pressure differential sensor that may detect pressures of between about −500 Pa to 500 Pa, with an accuracy of between or about 0.05 Pa and 0.5 Pa, although sensors capable of detecting other pressure ranges and/or accuracy levels are useable based on the needs of a particular application. The pressure differential gauge 110 may include an interface mechanism 116 that is engageable with an outlet of the fluid flow device 112. This may enable the pressure differential gauge 110 to take a pressure reading at the outlet, which may be compared to the inlet pressure to generate a pressure differential measurement across the fluid flow device 112.

The pressure differential across the inlet and outlet of the fluid flow device 112 may correspond to a flow conductance through the fluid flow device 112. This may enable changes in conductance to be monitored to determine whether any buildup and/or other blockages are present within the fluid flow device 112. For example, the pressure differential may be measured for newly manufactured and/or cleaned fluid flow devices 112 to generate baseline pressure differential levels that indicate a normal flow conductance through the fluid flow device 112. One or more pressure differential measurements may be taken after the fluid flow device 112 has been in operation. These pressure differential measurements may be compared to the baseline pressure differential measurements. If a difference between a given pressure differential measurement and the baseline pressure differential measurement is zero, it can be determined that there has been no change in flow conductance and there is likely no buildup or other blockage present within the fluid flow device 112. If the pressure differential drops relative to the baseline pressure differential (i.e., the backpressure increases), the flow conductance through the fluid flow device 112 decreases. This may be indicative of buildup of particulate within the fluid flow device 112. For example, residue deposits from an operating fluid (e.g., coking) may build up along the inner walls of the fluid flow device 112 and/or filters/screens within the fluid flow device 112 may be saturated with particulate, which may reduce the flow through the filter/screen.

Fluid flow device 112 may be any device through which a fluid is passed. Typically, fluid flow devices 112 tested using backpressure monitoring apparatus 100 are devices that transfer fluids that may leave residue that can build up as deposits that reduce the cross-sectional area of a flow path through the fluid flow device 112 and/or devices that include filters and/or screens that may filter particulate out of the fluid, and/or other devices through which a fluid is flowed. Fluid flow devices 112 may include, without limitation, fuel and/or other fluid nozzles, showerheads for film deposition operations in semiconductor processing chambers, cooling fluid channels, nanopores in transmembrane pressure applications, medical diagnostic tooling, spray applicators, and/or other devices through which a fluid is passed.

Figure 2:
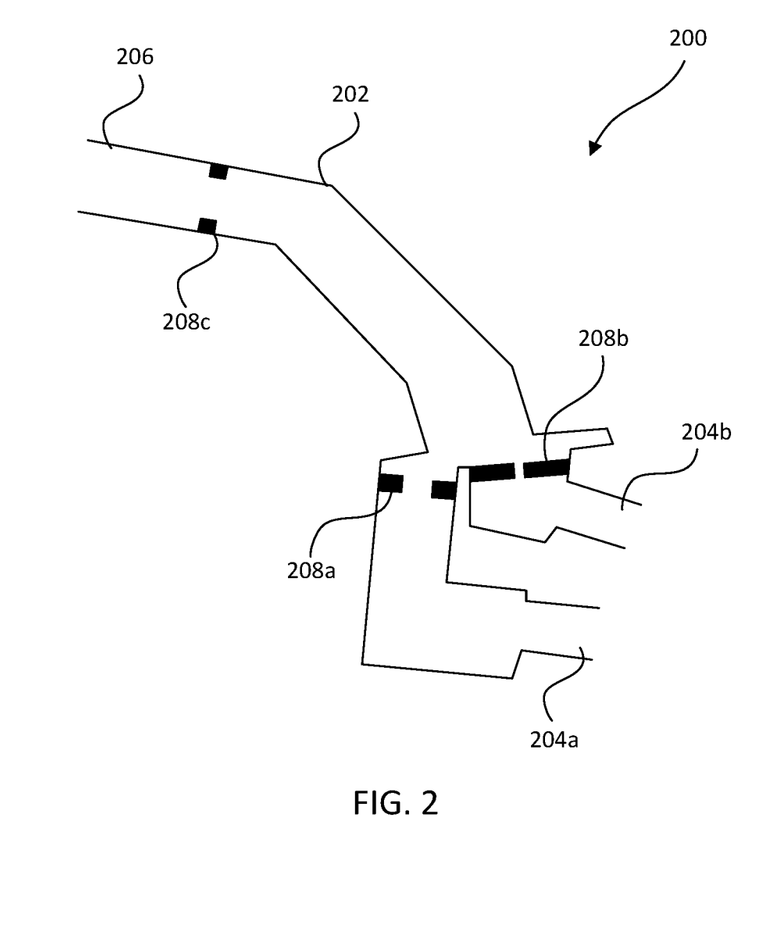
FIG. 2 illustrates a schematic cross-sectional view of an exemplary fuel nozzle according to some embodiments of the present technology.

FIG. 2 illustrates a schematic cross-sectional view of an exemplary fuel nozzle 200 according to some embodiments of the present technology. Fuel nozzle 200 may be used as fluid flow device 112 that may be tested by the backpressure monitoring apparatus 100. Fuel nozzle 200 may be used to deliver atomized fuel to a combustion unit of a vehicle, aircraft, or other machine. In a particular embodiment, fuel nozzle 200 may be used to supply fuel to the engine of a helicopter. Fuel nozzle 200 may include a nozzle body 202 that defines one or more inlets 204. As illustrated, fuel nozzle 200 includes two inlets 204a and 204b, however, in some embodiments only a single inlet or more than two inlets may be utilized. The use of multiple inlets 204 may help provide redundancy to the fuel system. For example, if a fuel pump coupled with one of the inlets 204 fails, fuel may still be delivered to the engine using a fuel pump coupled with another inlet 204. The nozzle body 202 may define at least one outlet 206 through which the fuel is ejected. The fuel nozzle 200 may include one or more flow restrictors 208 positioned within an interior of a flow path defined by the nozzle body 202. Each flow restrictor 208 may be a plate that defines an orifice of fixed diameter which is used to choke the fluid flow through the fuel nozzle 200. For example, a restrictor 208a may be positioned within inlet 204a, a restrictor 208b may be positioned within inlet 204b, and/or a restrictor 208c may be positioned within outlet 206. In some embodiments, the orifices of each restrictor 208 may have a same diameter, while in other embodiments some or all of the restrictors 208 may define orifices of different diameters. In some embodiments, the interior of the nozzle body 202 may be coated with an anti-coking material, which may help reduce and/or slow the buildup of carbon deposits (such as due to catalytic coking) within the nozzle body 202. For example, a coating having a thickness of less than or about 5 microns, less than or about 4 microns, less than or about 3 microns, less than or about 2 microns, less than or about 1 micron, less than or about 0.5 microns, or less may be applied to the interior surface of the nozzle body 202 without significantly affecting the flow conductance through fuel nozzle 200.

A backpressure and/or pressure differential of the fuel nozzle 200 may be measured using the backpressure monitoring apparatus 100. For example, the delivery tube 108 may be interfaced with one of the inlets 204 and the pressure differential gauge 110 may be interfaced with the outlet 206 to generate a voltage reading that corresponds with a given pressure differential across the selected inlet 204 and the outlet 206. The pressure differential may be tested for each inlet 204 individually, with the other inlet 204 being capped or otherwise occluded. Taking pressure differential measurements for a new and/or cleaned fuel nozzle 200 may yield baseline pressure differential measurements. Additional measurements may be taken after the fuel nozzle 200 has been in operation. These pressure differential measurements may be compared to the baseline measurements to determine whether the pressure differential and backpressure have changed. Changes in the pressure differential may be indicative of buildup of residue within the nozzle body 202 and/or saturation of filters and/or screens. By taking measurements across each of inlet 204a and inlet 204b, a location of the blockage may be determined. For example, if a pressure differential drop is measured when testing inlet 204a but not at inlet 204b, the blockage may be determined to be at inlet 204a. If a pressure differential drop is measured when testing inlet 204b but not at inlet 204a, the blockage may be determined to be at inlet 204b. If the measurements at both inlet 204a and 204b indicate a drop in pressure differential, the issue may be at the outlet 206 and/or possibly at both inlets 204.

Pressure differential measurements may also be taken prior to and after coating the interior of the nozzle body 202 with an anti-coking material. Such measurements may be used to determine whether the coating has significantly impacted the flow conductance through the nozzle 200. If the difference between the pressure differential prior to applying the coating and after applying the coating is too great, it may be indicative that a thinner (or no) coating should be used in the nozzle body 202.

Monitoring the pressure differential for fuel nozzle 200 may be particularly useful, as the fuel flowed through the nozzle 200 during operation may leave carbon deposits (e.g., coking) or other residue within the nozzle body 202. These deposits may continue to build up over time and may reduce the flow conductance through the nozzle to unsatisfactory levels. The pressure differential measurements may be indicative of a health and flow conductance of the fuel nozzle 200. This may enable a quick field test of the pressure differential to be made to determine whether the flow conductance is sufficiently high for the fuel nozzle 200 to remain in operation. The fuel nozzle 200 may be monitored without the need to replace, clean, or service the part, which may help increase service time and decrease downtime of the fuel nozzle and/or may provide a better indication of when the nozzle needs to be replaced or cleaned. Additionally, in vehicles, aircraft, and/or other machinery with multiple fuel nozzles 200, only those fuel nozzles having unsatisfactory flow conductance may need to be removed and/or cleaned at a given time. The pressure differential measurements may be used in place of, or to supplement, traditional spray pattern testing to determine a health of the fuel nozzles 200.

Figure 3:
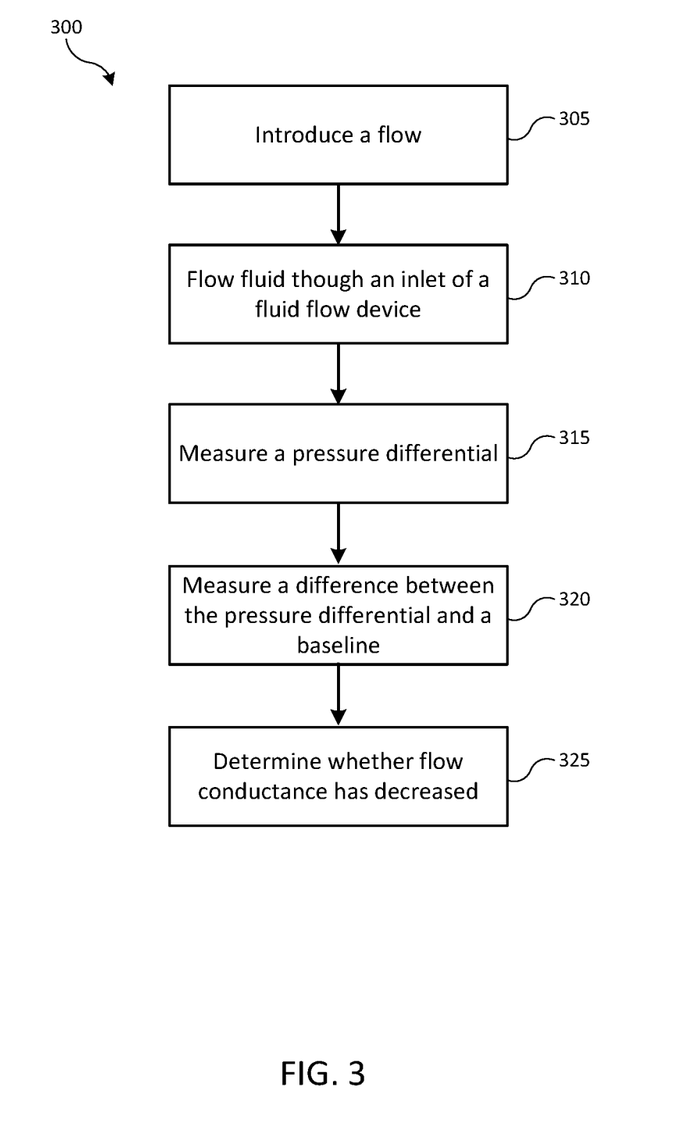
FIG. 3 shows operations of an exemplary method of monitoring backpressure in a fluid flow device according to some embodiments of the present technology.

FIG. 3 shows operations of an exemplary method 300 of monitoring backpressure in a fluid flow device according to some embodiments of the present technology. The method may be performed using a backpressure monitoring apparatus, including backpressure monitoring apparatus 100 described above. Method 300 may include a number of optional operations, which may or may not be specifically associated with some embodiments of methods according to the present technology. The method may include optional operations prior to initiation of method 300, or the method may include additional operations. For example, method 300 may include operations performed in different orders than illustrated.

Method 300 may include introducing a fluid through a flow control mechanism at operation 305. The fluid may include air, water, and/or other gas or liquid. The fluid may be at a fixed flow rate prior to and/or after leaving the flow control mechanism. In some embodiments, the flow control mechanism may be a mass flow controller, which may be used to control the flow rate of the fluid according to a set flow rate. In some embodiments, the fluid control mechanism may include a restrictor valve, which may enable fluid flow through the valve to be adjusted by adjusting a valve position. One or more flow settings, such as a flow rate and/or valve position, of the flow control mechanism may be adjusted to manipulate the fluid flow through the backpressure monitoring apparatus. A source of the fluid may be operated as a positive pressure source that pumps fluid through the backpressure monitoring apparatus and/or as a negative pressure source that creates a vacuum to draw a fluid through the backpressure monitoring apparatus. A negative pressure source may be chosen, for example, when flow through the fluid flow device is particularly restrictive. The negative pressure source may increase the magnitude of the voltage reading to provide a better pressure differential reading.

At operation 310, the fluid may be flowed through an inlet of a fluid flow device. The fluid flow device may be a fuel nozzle, a cooling channel (such as in turbine blades), a showerhead for distributing fluid (such as in a semiconductor processing chamber), an endoscope, a nanopore, and/or other device through which a fluid is flowed. A pressure differential between the inlet and an outlet of the fluid flow device may be measured at operation 315. For example, a pressure differential gauge of the backpressure monitoring apparatus may be fluidly coupled with each of the inlet and the outlet and may generate a voltage that corresponds to a specific pressure differential. Voltage readings with higher magnitudes may be indicative of higher backpressures and lower pressure differentials. In some embodiments the pressure differential may correspond with a flow conductance, such that the pressure differential measurement may also provide a quantitative value of the flow conductance through the fluid flow device. In some embodiments, the outlet of the fluid flow device may deliver the fluid to a pressurized environment. In such embodiments, the outlet and/or pressure differential gauge may be fluidly coupled with the pressurized environment (as ambient pressure is not usable as a reference pressure in such instances). For example, a first end of a fluid conduit may be coupled with the outlet and/or the pressure differential gauge, while an open second end of the fluid conduit may be positioned within the pressurized environment to enable the pressure from the environment to be used as a reference pressure.

At operation 320, method 300 may include measuring a difference between the pressure differential and a baseline pressure differential. The baseline pressure differential may be a measurement taken using a new and/or clean fluid flow device and may provide an indication of the flow conductance, pressure differential, and/or backpressure of the fluid flow device in an initial state. Subsequent measurements may be compared to this baseline and/or other prior measurement to determine whether any flow characteristics have changed after operation of the fluid flow device that may be indicative of residue and/or particulate buildup within the fluid flow device. For example, method 300 may include determining whether flow conductance is reduced through the fluid flow device based on the difference between the pressure differential and the baseline pressure differential at operation 325. Any number of pressure differential measurements may be taken of the fluid flow device over time. Changes in pressure differential and flow conductance over any number of measurements may be monitored. This may enable the health of the fluid flow device to be monitored to determine when too much buildup is present and/or when flow conductance is otherwise too low for the fluid flow device to remain operating at a desired level.

In some embodiments, a number of pressure differential measurements of the fluid flow device may be performed, with each of the measurements being taken using a different flow setting of the flow control mechanism. For example, when the flow control mechanism is a mass flow controller, a different flow rate may be used for each measurement. When the flow control mechanism is a restrictor valve, a different valve position may be used for each measurement. As the valve is opened wider, less backpressure may be added to the system. For example, each subsequent measurement may be taken with the valve being opened slightly more than in the previous measurement, which may reduce the backpressure added using the restrictor valve. In some embodiments a pressure differential curve may be generated based each of the pressure differential measurements taken at the various flow settings of the fluid control mechanism. By measuring pressure differentials of the fluid flow device across a number of different flow settings, it may increase the likelihood that measurements are collected at the most sensitive flow conditions through the fluid flow device.

In some embodiments, method 300 may include mapping the changes in flow conductance to changes in spray patterns of the fluid flow device. For example, each time a pressure differential measurement is taken, a spray pattern test may be performed. The results of each measurement/test may be plotted and/or otherwise analyzed together to identify any correlations between changes in flow conductance and changes in spray pattern. Such information may be useful in determining the health of a given fluid flow device and may help determine when the fluid flow device needs to be cleaned, serviced, and/or replaced.

In a particular embodiment, the fluid flow device may be a fuel nozzle, such as fuel nozzle 200 described above. In some embodiments, the nozzle may include an additional inlet. In such an embodiment, the method 300 may include measuring an additional pressure differential between the additional inlet and the outlet. The method 300 may include measuring a difference between the additional pressure differential and an additional baseline pressure differential. It may be determined whether flow conductance is reduced through the nozzle based on 1) the difference between the pressure differential and the baseline pressure differential and 2) the difference between the additional pressure differential and an additional baseline pressure differential. A source of reduced flow conductance through the nozzle may be determined based on 1) the pressure differential between the inlet and the outlet and 2) the pressure differential between the additional inlet and the outlet. For example, if a pressure differential drop is measured when testing a first inlet but not at a second inlet, the blockage may be determined to be at the first inlet. If a pressure differential drop is measured when testing the second inlet but not at the first inlet, the blockage may be determined to be at the second inlet. If the measurements at both inlets indicate a drop in pressure differential, the issue may be at the outlet and/or both inlets.

By monitoring the pressure differential for a fuel nozzle, any clogging due to residue buildup (e.g., from coking) and/or particulate may be detected. The pressure differential may be indicative of a given flow conductance through the nozzle, which may be used to determine whether the nozzle meets operating standards. This may enable the fuel nozzle 200 to be monitored without the need to replace, clean, or service the part. The backpressure monitoring may help increase service time and decrease downtime of the fuel nozzle and/or may provide a better indication of when the nozzle needs to be replaced or cleaned.

In some embodiments, the fluid flow device may be a cooling channel that supplies a cooling fluid to one or more areas of a device, such as in turbine applications. Flow conductance may be affected in cooling channels due to sand fouling, scale buildup, and/or delamination. Reductions in flow conductance through the cooling channel may reduce the amount of cooling fluid supplied to the turbine blades and may lead to superalloy overheating. This overheating may increase creep rates and stresses, which may in turn accelerate wear of the turbine blades and may shorten the lifespan of the blades. Typically, cooling channels for turbine blades are inspected visually and/or using x-ray evaluation. Embodiments of the present invention may involve coupling the pressure differential gauge to an inlet and an outlet of the cooling channel such that a pressure differential across the cooling channel may be measured. This measurement may be compared to a baseline value as described elsewhere herein to determine an amount of change in the backpressure and/or flow conductance through the cooling channel. This change may be attributed to the presence of sand fouling, scale buildup, and/or delamination and may be useful in determining whether a turbine blade may remain in operation, be refurbished, and/or be scrapped. In some embodiments, the backpressure monitoring apparatus may be integrated into the turbine design (or other fluid flow device) such that the pressure differential may be continually monitored. In such embodiments, the fluid source may be a source of the fluid that is used in operation of the device.

In some embodiments, the fluid flow device may be a showerhead or faceplate that distributes a fluid across a wide area, such as within a semiconductor processing chamber and/or in other chemical vapor deposition coating applications. These showerheads may include hundreds or thousands of apertures. Blockages and/or buildup of film and other residue within one or more of the apertures may cause flow uniformity issues across a surface area of the showerhead, which may have negative effects on film deposition uniformity on a semiconductor substrate or other deposition or coating applications. In some cases, showerheads for semiconductor processing chambers utilize visual inspection, sensor plates, and/or pin gauges to measure outlet properties of the various apertures. Embodiments of the present invention may involve coupling the pressure differential gauge to an inlet and an outlet of the showerhead as a whole (to get a system-wide view of pressure differential) and/or to each individual aperture (to get information on the flow conductance through a given aperture) such that a pressure differential across the showerhead and/or aperture may be measured. This measurement may be compared to a baseline value as described elsewhere herein to determine an amount of change in the backpressure and/or flow conductance through the showerhead and/or aperture. Such techniques may provide more detailed insight into the flow distribution of the showerhead and may help address non-uniformity issues by cleaning, servicing, and/or re-designing the showerhead. Additionally, such techniques are more accurate than visual inspection and safer than using pin gauges.

In some embodiments, the fluid flow device may be an endoscope used in medical diagnostic procedures for conditions such as abdominal pain, heartburn, persistent nausea, GI bleeding, etc. For example, the endoscope may be used in the insufflation of one more body parts such as, but not limited to, the esophagus, stomach, and/or duodenum. During the insufflation process, a gas, such as $CO_2$ and/or air may be blown into a body cavity to slightly expand the cavity to facilitate visual inspection. These insufflation procedures may benefit from stable endoluminal pressure during examination, which may be difficult to achieve with existing manually-operated endoscopes. Embodiments of the present technology may include attaching the backpressure monitoring device to a fluid inlet and outlet of the endoscope and using the flow control mechanism to stabilize flow through the endoscope prior to measuring differential pressure. This stabilized flow may improve measurement stability and may enhance the diagnostic capabilities of endoscopes.

In some embodiments, the fluid flow device may be a nanopore, such as a nanopore used in DNA sequencing. For example, the nanopores may be formed in an electrically insulating membrane and may be used as a single-molecule detector. An ionic current passing through the nanopore may be monitored as a voltage is applied across the membrane. When the nanopore is of molecular dimensions, passage of DNA (or other molecules) causes interruptions of the "open" current level, leading to a "translocation event" signal. To properly function, the diameter and length of each nanopore must be carefully controlled. Currently, characterization of the dimensions of the nanopores is done using imaging techniques such as scanning electron microscopy (SEM), transmission electron microscopy (TEM), and/or atomic force microscopy (AFM). Embodiments of the present technology may include adapting the backpressure monitoring device to couple with a fluid inlet and outlet of the nanopore and measuring low differential pressure (such as less than or about 5 Pa, less than or about 1 Pa, or less) across the nanopore to determine the dimensional characteristics of the nanopore and ensure that the nanopore is suitable for use in DNA sequencing (or other applications).

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where neither of the limits, either limit, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a layer" includes a plurality of such layers, and reference to "the precursor" includes reference to one or more precursors and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A method of monitoring backpressure in a fluid flow device, comprising:
   introducing a fluid through a flow control mechanism, wherein the fluid is at a fixed flow rate;
   flowing the fluid through an inlet of a nozzle;
   measuring a pressure differential between the inlet and a spray outlet of the nozzle;
   measuring a difference between the pressure differential and a baseline pressure differential that is indicative of flow through a new nozzle; and
   determining whether flow conductance is reduced through the nozzle based on the difference between the pressure differential and the baseline pressure differential.

2. The method of monitoring backpressure in a fluid flow device of claim 1, wherein:
   the nozzle comprises an additional inlet; and
   the method further comprises:
      measuring an additional pressure differential between the additional inlet and the outlet;
      measuring a difference between the additional pressure differential and an additional baseline pressure differential; and
      determining whether flow conductance is reduced through the nozzle based on the difference between the pressure differential and the baseline pressure differential and the difference between the additional pressure differential and an additional baseline pressure differential.

3. The method of monitoring backpressure in a fluid flow device of claim 2, further comprising:
   determining a source of reduced flow conductance through the nozzle based on the pressure differential between the inlet and the outlet and the pressure differential between the additional inlet and the outlet.

4. The method of monitoring backpressure in a fluid flow device of claim 1, wherein:
   the flow control mechanism comprises a restrictor valve;
   the fluid is introduced while the restrictor valve is at a first valve position; and
   the method further comprises:
      adjusting a restrictor valve to a second valve position; and
      measuring the pressure differential between the inlet and the outlet at the second valve position.

5. The method of monitoring backpressure in a fluid flow device of claim 1, further comprising:
   determining a flow conductance through the nozzle based on the pressure differential.

6. The method of monitoring backpressure in a fluid flow device of claim 1, wherein:
   a negative pressure source is used to introduce the fluid through the flow control mechanism.

7. The method of monitoring backpressure in a fluid flow device of claim 1, further comprising:
   coating an interior of the nozzle with an anti-coking material;
   measuring a pressure differential between the inlet and the outlet of the coated nozzle; and
   measuring a difference between the pressure differential between the inlet and the outlet of the coated nozzle and the baseline pressure differential.

8. A method of monitoring backpressure in a fluid flow device, comprising:
   flowing a fluid through an inlet of a fluid flow device;
   measuring a pressure differential between the inlet and a spray outlet of the fluid flow device;
   measuring a difference between the pressure differential and a baseline pressure differential that is indicative of flow through a new fluid flow device; and
   determining whether flow conductance is reduced through the fluid flow device based on the difference between the pressure differential and the baseline pressure differential.

9. The method of monitoring backpressure in a fluid flow device of claim 8, wherein:
   the fluid flow device comprises a fuel nozzle, a cooling channel, a showerhead for distributing fluid, an endoscope, or a nanopore.

10. The method of monitoring backpressure in a fluid flow device of claim 8, wherein:
    the outlet delivers the fluid to a pressurized environment; and
    the method further comprises coupling a first end of a fluid conduit with the outlet and positioning an open second end of the fluid conduit within the pressurized environment.

11. The method of monitoring backpressure in a fluid flow device of claim 8, further comprising:
    measuring the pressure differential between the inlet and the outlet at a plurality of different flow settings of a flow control mechanism that is coupled with a source of the fluid; and
    generating a pressure differential curve based on the pressure differential measured at each of the plurality of different flow settings of the flow control mechanism.

12. The method of monitoring backpressure in a fluid flow device of claim 8, further comprising:
    determining a flow conductance through the fluid flow device based on the pressure differential.

13. The method of monitoring backpressure in a fluid flow device of claim 8, further comprising:
    monitoring changes in flow conductance through the fluid flow device based on a plurality of pressure differential measurements.

14. The method of monitoring backpressure in a fluid flow device of claim 13, further comprising:
    emitting a spray of the fluid through the outlet of the fluid flow device; and
    mapping the changes in flow conductance to changes in spray patterns of the fluid flow device.

\* \* \* \* \*